United States Patent [19]
Jackson

[11] Patent Number: 6,082,819
[45] Date of Patent: Jul. 4, 2000

[54] CHILD SAFETY SEAT

[75] Inventor: Peter Graham Stanley Jackson, Long Buckby, United Kingdom

[73] Assignee: Britax Excelsior Limited, Warwick, United Kingdom

[21] Appl. No.: 09/286,228

[22] Filed: Apr. 5, 1999

[30] Foreign Application Priority Data

Apr. 25, 1998 [GB] United Kingdom .................... 9808785

[51] Int. Cl.7 ................................................... A47C 1/08
[52] U.S. Cl. .................. 297/253; 297/256.16; 297/250.1
[58] Field of Search .................................... 297/253, 252, 297/250.1, 256.1, 256.16

[56] References Cited

U.S. PATENT DOCUMENTS

| | | | |
|---|---|---|---|
| 5,466,044 | 11/1995 | Barley et al. ........................ | 297/253 X |
| 5,487,588 | 1/1996 | Burleigh et al. ........................ | 297/253 |
| 5,524,965 | 6/1996 | Barley ................................. | 297/256.16 |
| 5,816,651 | 10/1998 | Feuerherdt .............................. | 297/253 |
| 5,941,601 | 8/1999 | Scott et al. ............................. | 297/253 |
| 6,030,046 | 2/2000 | Dorow ................................. | 297/253 X |

FOREIGN PATENT DOCUMENTS

0703113A2  3/1996  European Pat. Off. .

*Primary Examiner*—Laurie K. Cranmer
*Attorney, Agent, or Firm*—Davis and Bujold

[57] ABSTRACT

A child safety seat comprises a base adapted to rest on a vehicle seat, a seat body mounted on the base and a pair of releasable connectors projecting from the base and having a first latch for engagement with a standard anchorage unit associated with the vehicle seat. Each connector is secured to the base by a retractable coupling member having a second latch adapted to block retraction of the coupling member when the coupling member is fully extended. The first latch is coupled to the second latch to allow disengagement of the second latch when the first latch is engaged with a standard anchorage unit.

20 Claims, 5 Drawing Sheets

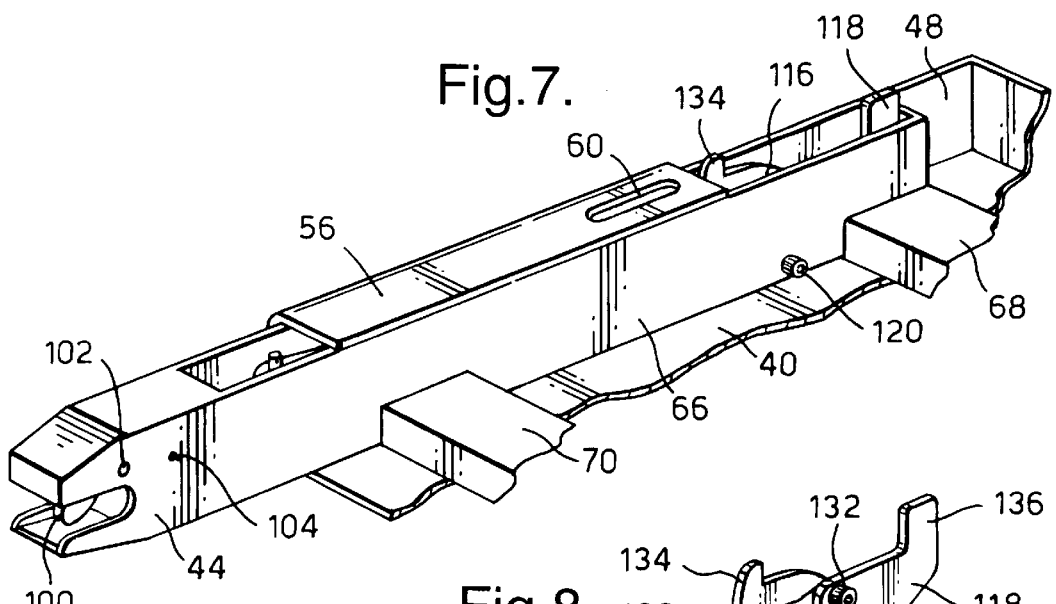
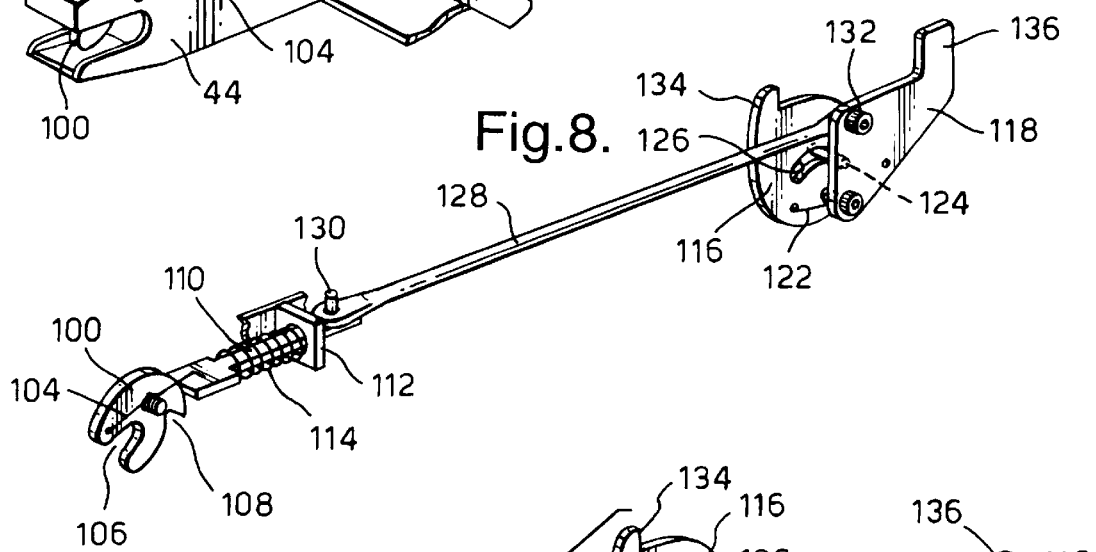
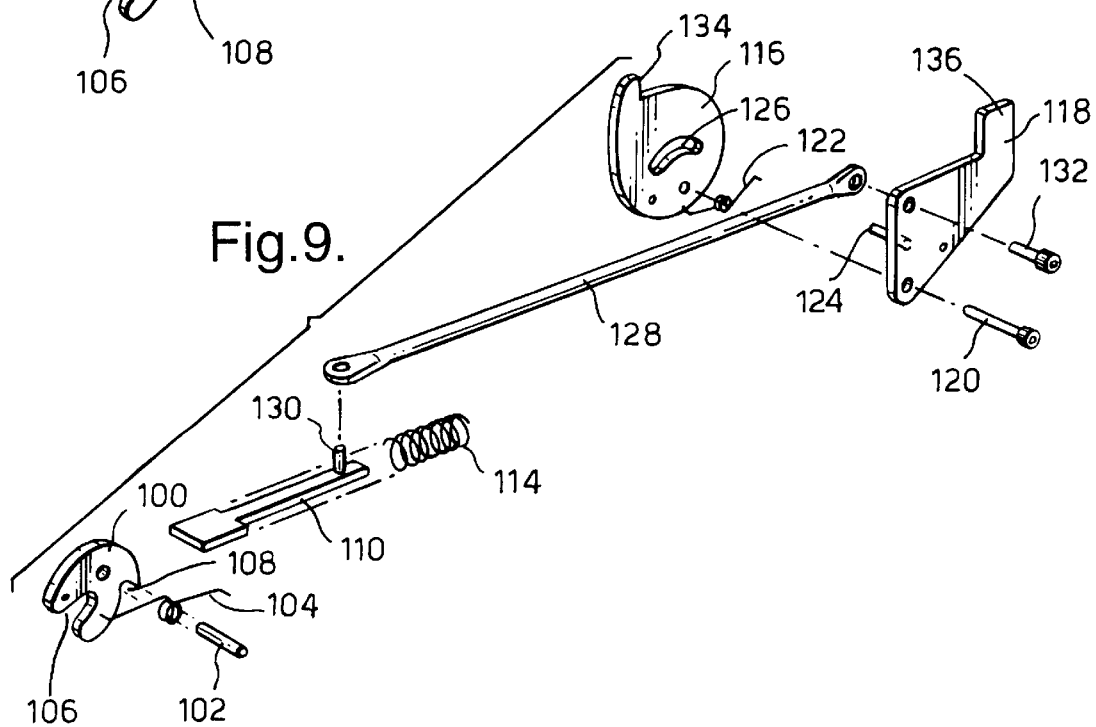

CHILD SAFETY SEAT

FIELD

This invention relates to a child safety seat for use in a vehicle.

RELATED ART

It is well known for a child safety seat to rest on a vehicle seat and to be secured thereon by the corresponding vehicle seat belt. The disadvantage of this arrangement is that, even if the vehicle seat belt is pulled very tight during installation, the resilience of the belt, will permit undesirable movement of the child seat relative to the vehicle in the event of sudden deceleration, for example, during an accident. In order to overcome this disadvantage, it has been proposed to provide vehicle seats with standard anchorage units at agreed locations for engagement by releasable connectors which are rigidly attached to the child seat. Such anchorage units will be referred to hereinafter as "standard anchorage units".

The invention relates to a child safety seat of the type comprising a base adapted to rest on a vehicle seat, a seat body mounted on the base and a releasable connector projecting from the base and having a first latch for engagement with a standard anchorage unit associated with the vehicle seat. EP-A-0703113 discloses such a child safety seat for use with four standard anchorage units. More recently it has been proposed that vehicles should be provided with standard anchorage units located only near the rear edge of the vehicle seat cushion and the bottom of the vehicle seat back. The present invention aims to provide a child safety seat suitable for use with this arrangement.

SUMMARY OF THE INVENTION

According to the invention, in a child safety seat of the type described above the connector is secured to the base by a retractable coupling member having a second latch adapted to block retraction of the coupling member when the coupling member is fully extended, and link means coupling the first latch to the second latch to allow disengagement of the second latch when the first latch is engaged with a standard anchorage unit.

Thus, the retractable coupling member is held in its fully extended position until the first latches have been fastened, thereby securing the child seat in the vehicle. Thereafter, the coupling member can be partially retracted so as to move the child seat into close abutment with the vehicle seat back. Manually releasable ratchet means may be provided to limit subsequent extension of the coupling member. Preferably the manual release for the ratchet means is positioned so as to be inaccessible when the child seat is positioned on a vehicle seat. Where two standard anchorage units are provided, the retractable coupling member has a separate releasable connector for each anchorage unit.

BRIEF DESCRIPTION OF THE DRAWINGS

FIG. 7 is a fragmentary perspective view of part of the base assembly of FIG. 3, showing one of the releasable connectors in an extended position;

FIG. 8 is a perspective view of a latch mechanism for the connector shown in FIG. 5; and FIG. 9 is an exploded perspective view of the mechanism shown in FIG. 8.

DETAILED DESCRIPTION OF THE PREFERRED EMBODIMENT

Figure 1:
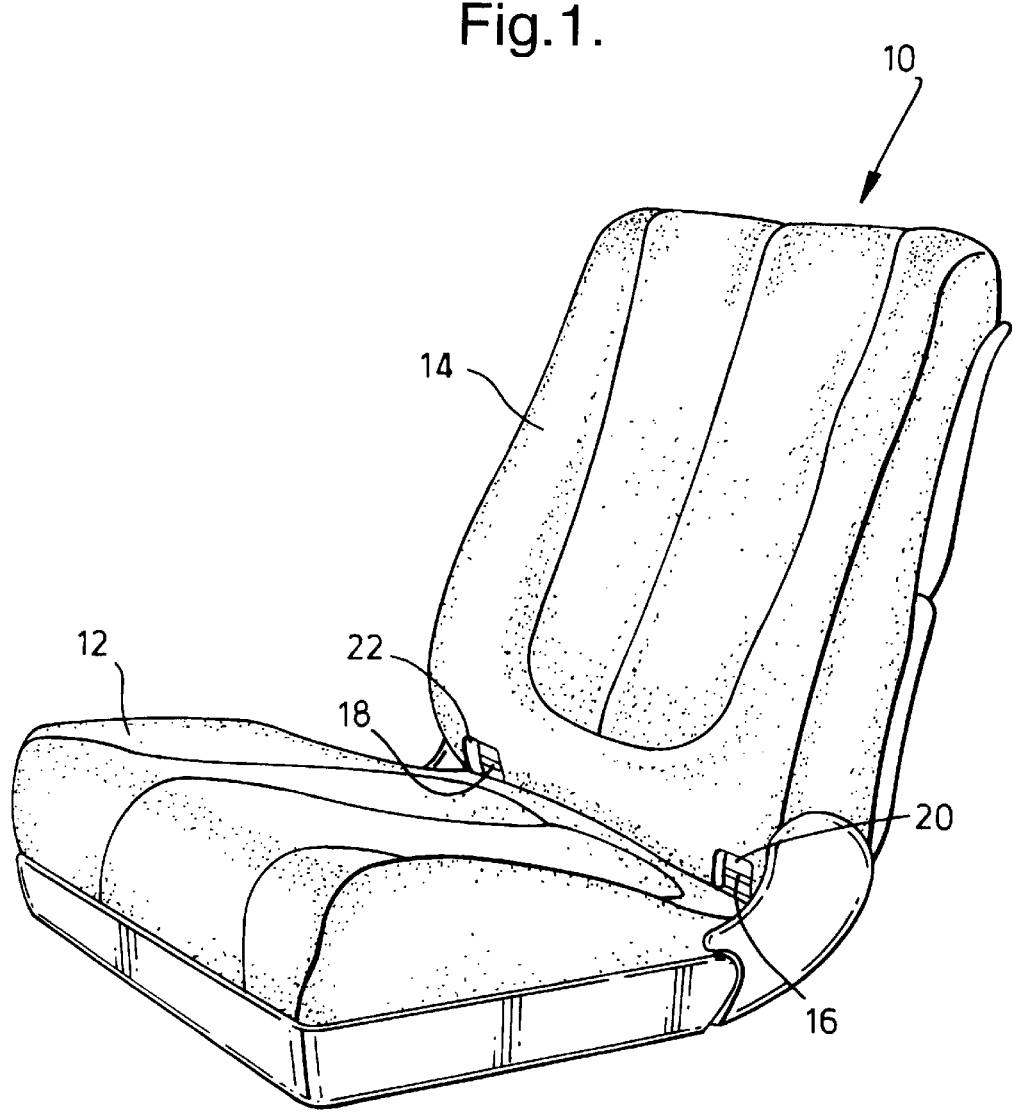
FIG. 1 is a perspective view of a vehicle seat equipped with standard anchorage units.

FIG. 1 shows a vehicle seat 10 equipped with two standard anchorage units according to the first proposal. The seat 10 comprises a seat cushion 12 and a backrest 14. The two standard anchorage units comprise transversely extending rods 16 and 18 which are accessible through openings 20 and 22 in the bottom of the backrest and which are rigidly secured to the frame (not shown) of the seat 10.

Figure 2:
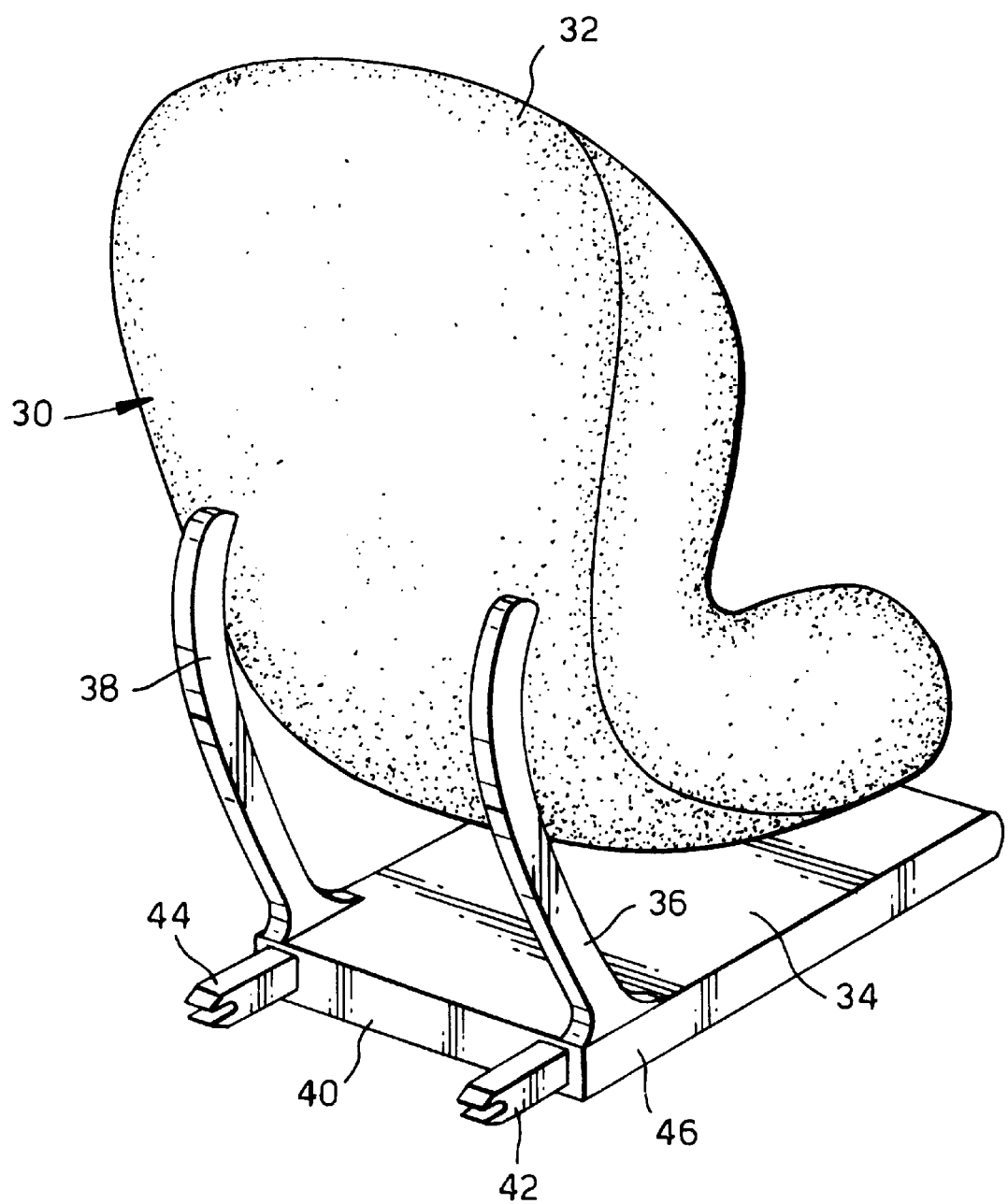
FIG. 2 is a perspective view from behind of a child seat having releasable connectors for engaging with the standard anchorage units of the seat shown in FIG. 1.

FIG. 2 shows a child safety seat 30 for use with the anchorage units shown in FIG. 1. The seat 30 comprises a moulded plastics body 32 mounted on a base cover 34 by support arms 36 and 38 and a front support (not shown) under the front part of the seat body 32. The base cover 34 is secured to a base plate 40 which has a releasable connector 42 for engagement with the rod 18 and an identical releasable connector 44 for engagement with the rod 16.

Figure 3:
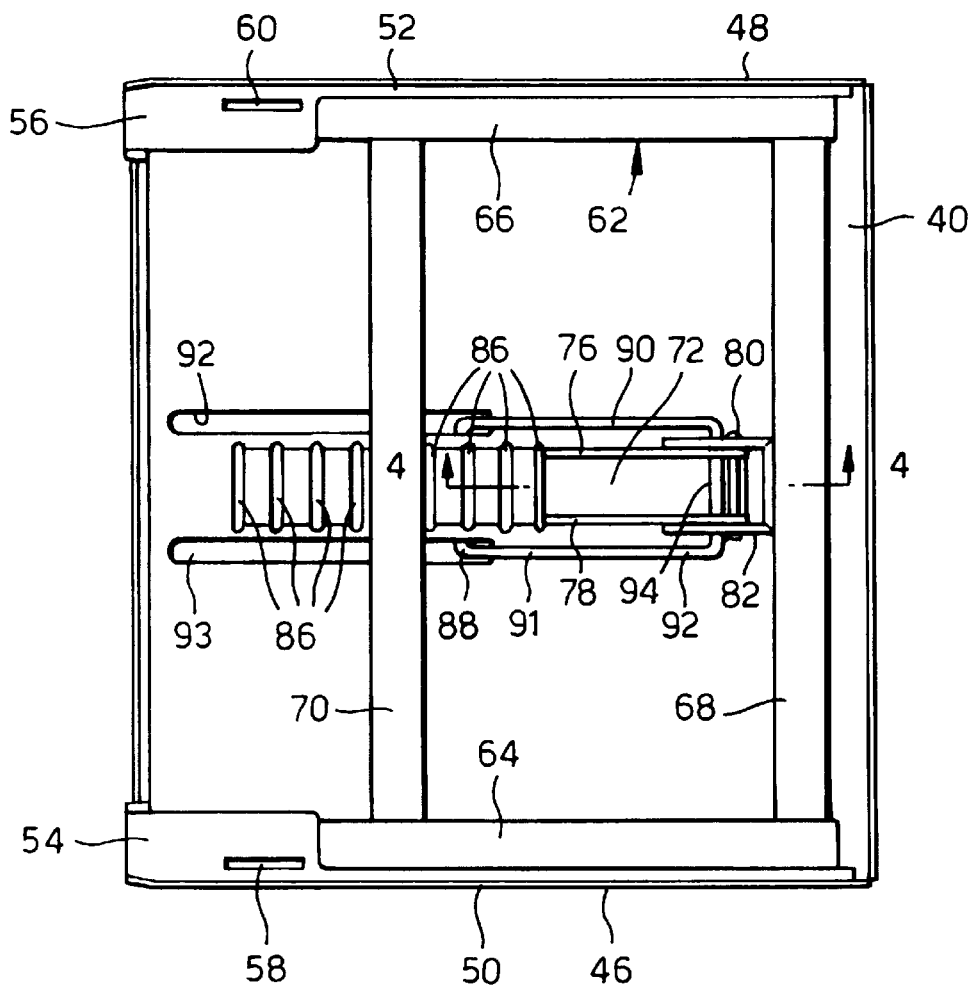
FIG. 3 is a plan view of a base assembly of the seat shown in FIG. 2, with the releasable connectors in a retracted position.

FIG. 3 shows the base plate 40 with the cover 34 removed. The base plate 40 has side flanges 46 and 48, the upper edges 50 and 52 of which are bent inwardly to form mutually opposite U-shaped channels. The in-turned edges 50 and 52 have enlarged portions 54 and 56 at their rear ends containing slots 58 and 60 respectively.

Figure 4:
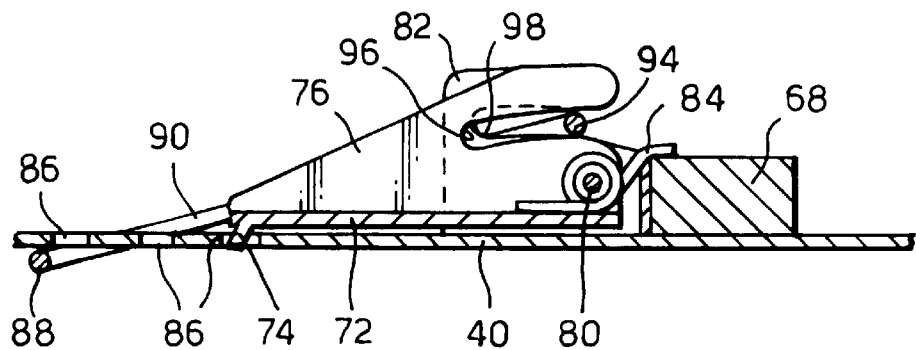
FIG. 4 is a scrap sectional view on the line 4—4 in FIG. 3, showing a slide latch in an engaged position.

A coupling frame 62 comprises side members 64 and 66 interconnected by front and rear cross members 68 and 70. The side members 64 and 66 are slidably mounted in the U-shaped channels formed by the flanges 46 and 48. A pawl 72, having a ratchet detent 74 and side walls 76 and 78 (see also FIG. 4) is mounted on a pivot pin 80 which extends between the side limbs of a U-shaped bracket 82 which is secured to the rear edge of the front cross member 68 of the coupling frame 62. A spring 84 (FIG. 4) biasses the detent 74 into engagement with one of a series of slots 86 in the base plate 40. The detent 74 slopes downwardly and rearwardly so as to allow forward movement of the coupling frame 62 relative to the base plate 40 but to obstruct the equivalent rearward movement.

Figure 5:
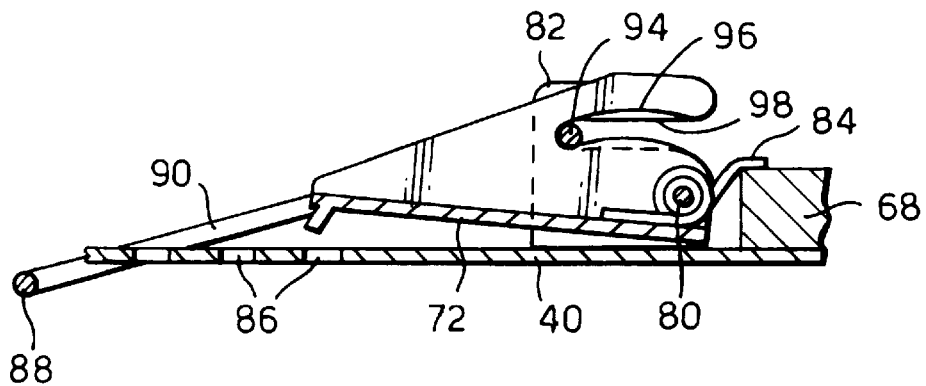
FIG. 5 is a scrap sectional view, similar to FIG. 4, but showing the slide latch in a disengaged position.
Figure 6:
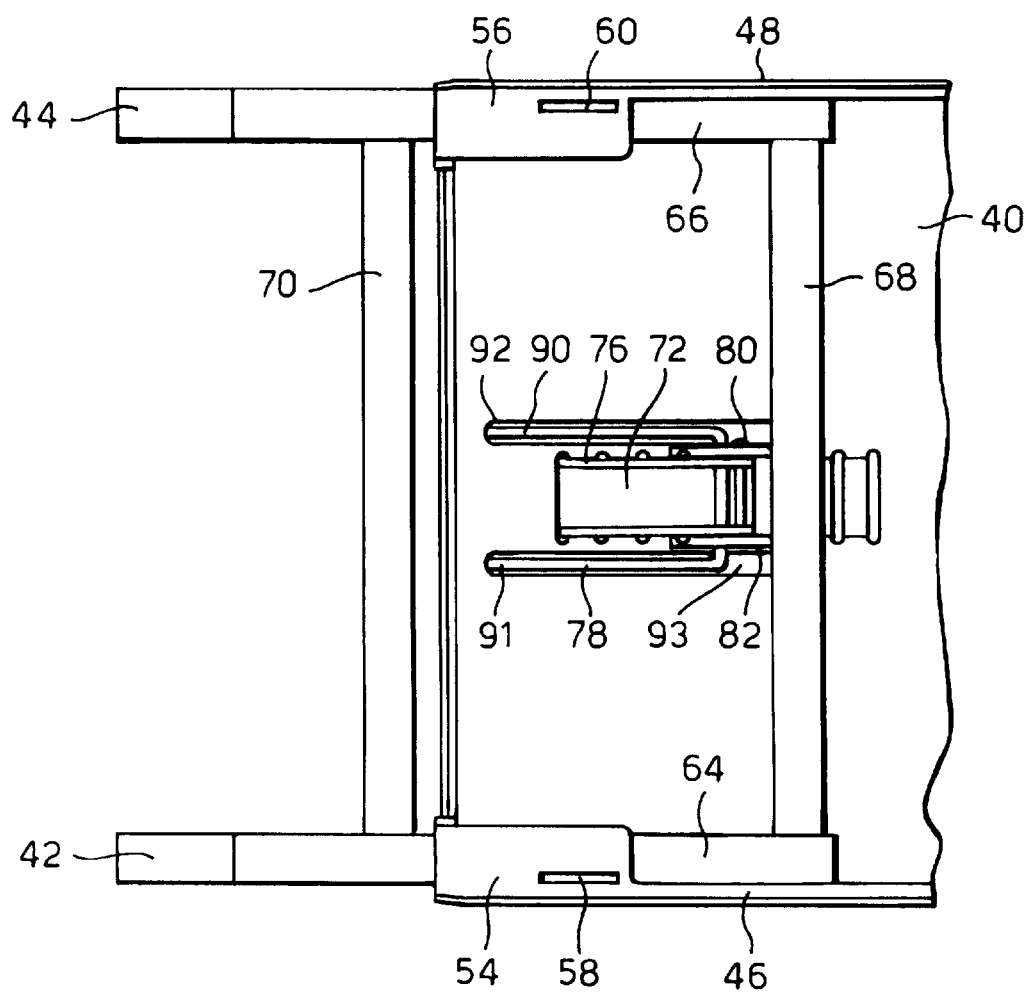
FIG. 6 is a plan view of the rear part of base assembly shown in FIG. 3, with the releasable connectors in an extended position.

A manually actuable handle 88 is accommodated in a recess (not shown) in the base plate 40 so as to be accessible from below. The handle 88 is mounted on rods 90 and 91 which extend through respective slots 92 and 93 in the base plate 40 and are connected to a transverse rod 94 which engages in arcuate slots 96 in the side walls 76 and 78 of the pawl 72 and also in straight slots 98 in the side limbs of the bracket 82 so that, by pulling rearwardly on the handle 88, the rod 94 can be moved to the rear ends of the slots 96 and 98 so as to disengage the detent 74, as shown in FIG. 5. The coupling frame 62 can then slide rearwardly so that the rear ends of its side members 64 and 66, on which the releasable connectors 42 and 44 (FIG. 2) are mounted, project beyond the rear edge of the base plate 40.

FIGS. 7 to 9 show the mechanism in the side member 66 and the associated releasable connector 44 in more detail.

The connector 44 has a latch plate 100 mounted on a pivot pin 102. (The latch plate 100 is biased in the clockwise direction by a spring 104 and has a hook-like formation 106 for engagement with one of the rods 18 and 20. The latch plate 100 also has a notch 108 which can be engaged by a catch 110 which is slidably mounted in a slide guide 112 on the inside of the wall of the connector 44, and biased into engagement with the latch plate 100 by a compression spring 114.

The side member 66 is hollow and has both a trigger plate 116 and a release lever 118 pivotally mounted on a pin 120 and sprung apart from one another by a torsion spring 122. The release lever 118 has a guide pin 124 which engages in an arcuate slot 126 in the trigger plate 116 so as to limit relative angular movement. A coupling rod 128, extends between a pin 130 on the catch 110 and a pin 132 on the release lever 118, so as to pull the catch 110 into its released position.

The side member 64 and releasable connector 42 have an identical mechanism.

When it is desired to install the child seat 30 on the vehicle seat 10 (FIG. 1) starting from the position shown in FIG. 3 where the coupling frame 62 is fully retracted between the base cover 34 and the base plate 40, the handle 88 is pulled rearwardly so as to release the detent 74. Next, the coupling frame 62 is moved to its fully extended position in which the detent 74 engages in the rearmost slot 86. The trigger plates 116 pivot in the clockwise direction, as viewed in FIGS. 7 to 9, as a respective projection 134 on each trigger plate 116 engages with the rear edges of the corresponding flange portions 54 and 56. The projections 134 then engage in the slots 58 and 60 so as to hold the coupling frame 62 in its fully protracted position, counter-clockwise movement of each trigger plate 116, which could have allowed the projection 134 to disengage, being blocked by engagement of the pin 124 on the corresponding release levers 118 with its slot 126.

Next, the child seat 30 is pushed rearwardly on the vehicle seat 10 so that the connectors 42 and 44 engage with the rods 18 and 16 respectively, the latch plate 100 of each connector 42, 44 moving counter-clockwise on their pivot pins 102. The catch 110 moves into engagement with the notch 108 to hold the latch plate 100 in its engaged position, this movement also causing the coupling rod 128 to pull the release lever 118 in the counter-clockwise direction, moving the pin 124 along the slot 126. This frees each trigger plate 116 to pivot in the counter-clockwise direction, allowing its projection 134 to disengage from the corresponding slot 58, 60. The child seat 30 can then be pushed towards the backrest 14 of the vehicle seat 10, the ratchet detent 74 jumping over successive slots 86 and dropping into one of these slots to hold the child seat 30 firmly against the vehicle seat back 14.

In order to release the child seat 30 from the vehicle seat, push pads 136 on the release levers 118 are depressed, pulling on the rods 128 so as to disengage the catches 110 from the latch plates 100 which are then turned by the springs 104 so as to disengage from the rods 16 and 18. The child seat 30 can now be removed from the vehicle seat 10, after which the connecting frame 62 can be pushed to its fully retracted position as shown in FIG. 3.

If desired, the coupling frame may be resiliently biased into its retracted position by springs (not shown).

What is claimed is:

1. A child safety seat comprising:
    a base adapted to rest on a vehicle seat, a seat body mounted on the base,
    a releasable connector projecting from the base and having a first latch for engagement with a standard anchorage unit,
    a retractable coupling member securing the connector to the base and having a second latch adapted to block retraction of the coupling member when the coupling member is fully extended, and
    link means coupling the first latch to the second latch to allow disengagement of the second latch when the first latch is engaged with a standard anchorage unit.

2. A child safety seat according to claim 1, further comprising:
    a pawl mounted on the retractable coupling member and arranged engage with complementary formations on the base to resist protraction of the retractable coupling member, and
    a manually operable release mechanism for causing said pawl to disengage from said complementary formations.

3. A child safety seat according to claim 2, wherein said manually operable release mechanism comprises a first cam formation on the pawl, a second cam formation on the retractable coupling member and a cam follower connected to a handle and arranged to engage between said first and second cam formations to cause angular movement of the pawl.

4. A child safety seat according to claim 3, wherein one of said first and second cam formations comprises an arcuate slot and the other of said first and second cam formations comprises a straight slot.

5. A child safety seat according to claim 2, wherein the manually operable release mechanism is positioned so as to be inaccessible when the base is positioned on a vehicle seat.

6. A child safety seat according to claim 2, wherein the second latch is mounted for a predetermined range of angular movement on the retractible coupling member for engagement with a complementary formation on the base.

7. A child safety seat according to claim 6, wherein the link means comprises a release lever mounted for angular movement on the retractible coupling member and having a stop formation arranged to engage with a complementary formation on the second latch for varying said predetermined range of angular movement in dependence on the orientation of the release lever, a position sensor linked to the release lever and responsive to engagement of the first latch to move the release lever to an orientation in which said predetermined range of angular movement includes an orientation in which the second latch disengages.

8. A child safety seat according to claim 7, wherein the stop formation comprises a pin and the complementary formation comprises an arcuate slot with the pin engaged therein.

9. A child safety seat according to claim 7, wherein the position sensor comprises a detent adapted to engage with the first latch thereby to retain it in its engaged position.

10. A child safety seat according to claim 9, wherein the release lever includes a manually engageable formation for causing movement of the disengagement of the position sensor to release the first latch.

11. A child safety seat according to claim 7, wherein a second releasable connector has a first latch for engagement with a second standard anchorage unit associated with the vehicle seat, the second releasable connector being secured to said retractable coupling member.

12. A child safety seat according to claim 2, wherein a second releasable connector has a first latch for engagement with a second standard anchorage unit associated with the vehicle seat, the second releasable connector being secured to said retractable coupling member.

13. A child safety seat according to claim 1, wherein the second latch is mounted for a predetermined range of angular movement on the retractible coupling member for engagement with a complementary formation on the base.

14. A child safety seat according to claim 13, wherein the link means comprises a release lever mounted for angular movement on the retractible coupling member and having a stop formation arranged to engage with a complementary formation on the second latch for varying said predetermined range of angular movement in dependence on the orientation of the release lever, a position sensor linked to the release lever and responsive to engagement of the first latch to move the release lever to an orientation in which said predetermined range of angular movement includes an orientation in which the second latch disengages.

15. A child safety seat according to claim 14, wherein the stop formation comprises a pin and the complementary formation comprises an arcuate slot with the pin engaged therein.

16. A child safety seat according to claim 14, wherein the position sensor comprises a detent adapted to engage with the first latch thereby to retain it in its engaged position.

17. A child safety seat according to claim 16, wherein the release lever includes a manually engageable formation for causing movement of the disengagement of the position sensor to release the first latch.

18. A child safety seat according to claim 14, wherein a second releasable connector has a first latch for engagement with a second standard anchorage unit associated with the vehicle seat, the second releasable connector being secured to said retractable coupling member.

19. A child safety seat according to claim 13, wherein a second releasable connector has a first latch for engagement with a second standard anchorage unit associated with the vehicle seat, the second releasable connector being secured to said retractable coupling member.

20. A child safety seat according to claim 1, wherein a second releasable connector has a first latch for engagement with a second standard anchorage unit associated with the vehicle seat, the second releasable connector being secured to said retractable coupling member.

* * * * *